United States Patent
Yang et al.

(10) Patent No.: US 12,335,949 B2
(45) Date of Patent: Jun. 17, 2025

(54) MULTIPLEXING HIGH PRIORITY AND LOW PRIORITY UPLINK CONTROL INFORMATION (UCI) ON AN UPLINK TRANSMISSION

(71) Applicant: QUALCOMM Incorporated, San Diego, CA (US)

(72) Inventors: Wei Yang, San Diego, CA (US); Wanshi Chen, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/664,088

(22) Filed: May 19, 2022

(65) Prior Publication Data

US 2022/0377723 A1    Nov. 24, 2022

Related U.S. Application Data

(60) Provisional application No. 63/191,895, filed on May 21, 2021.

(51) Int. Cl.
*H04W 72/20* (2023.01)
*H04L 69/04* (2022.01)
*H04W 72/56* (2023.01)

(52) U.S. Cl.
CPC ............. *H04W 72/20* (2023.01); *H04L 69/04* (2013.01); *H04W 72/56* (2023.01)

(58) Field of Classification Search
CPC ........ H04W 72/20; H04W 72/56; H04L 69/04
(Continued)

(56) References Cited

U.S. PATENT DOCUMENTS

2020/0099393 A1*  3/2020  Xu .................. H03M 13/13
2022/0232574 A1*  7/2022  Yang .................... H04L 1/0061
(Continued)

OTHER PUBLICATIONS

Ericsson: "Intra-UE Multiplexing/Prioritization Enhancements for IIoT/URLLC", R1-2104220, 3GPP TSG-RAN WG1 Meeting #105-e, 3rd Generation Partnership Project, Mobile Competence Centre, 650, Route Des Lucioles, F-06921 Sophia-Antipolis Cedex, France, vol. RAN WG1, No. e-Meeting, May 12, 2021-May 20, 2021, May 12, 2021, XP052010680, paragraph [4.3.1], pp. 1-26.
(Continued)

*Primary Examiner* — Christopher B Robinson
*Assistant Examiner* — Chong G Kim
(74) *Attorney, Agent, or Firm* — NORTON ROSE FULBRIGHT US LLP

(57) ABSTRACT

This disclosure provides systems, methods, and devices for wireless communication that support managing compression and compression indications of a low-priority (LP) uplink control information (UCI) message that is multiplexed with a high-priority (HP) UCI message in a wireless communication system. In particular, a user equipment (UE) determines a compression indication for the LP UCI message, encodes the compression indication jointly with the HP UCI payload, and separately encodes the LP UCI payload. The encoded LP UCI payload is multiplexed with the jointly-encoded compression indication and HP UCI payload in an uplink transmission to a base station. The compression indication includes information related to whether and how the LP UCI has been compressed. The base station decodes the compression indication and then decodes the LP UCI message based on the compression indication.

25 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2022/0330234 | A1* | 10/2022 | Yang | H04W 72/56 |
| 2022/0377731 | A1* | 11/2022 | Yang | H04W 72/21 |
| 2023/0422242 | A1* | 12/2023 | Guo | H04W 72/56 |
| 2024/0146467 | A1* | 5/2024 | Yin | H04L 1/1854 |
| 2024/0244623 | A1* | 7/2024 | Yang | H04W 72/232 |

OTHER PUBLICATIONS

International Search Report and Written Opinion—PCT/US2022/072472—ISA/EPO—Sep. 9, 2022.
Moderator (OPPO) : "Summary#1 of email Thread [104-e-NR-R17-IIoT_URLLC-04]", R1-2101842, 3GPP TSG RAN WG1 #104-e, 3rd Generation Partnership Project, Mobile Competence Centre, 650, Route Des Lucioles, F-06921, Sophia-Antipolis Cedex, France, vol. Ran WG1, No. e-Meeting, Jan. 25, 2021-Feb. 5, 2021, Feb. 8, 2021, XP051977631, 123 Pages.
OPPO: "Enhancements on Intra-UE Multiplexing/Prioritization", R1-2008282, 3GPP TSG RAN WG1 #103-e, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946612, the whole document, 6 Pages.
ZTE: "Discussion on Enhanced Intra-UE Multiplexing", R1-2102496, 3GPP TSG RAN WG1 #104bis-e, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177202, pp. 1-20, paragraph [02.1]—paragraph [02.2] paragraph [03.3]—paragraph [03.4].

* cited by examiner

MULTIPLEXING HIGH PRIORITY AND LOW PRIORITY UPLINK CONTROL INFORMATION (UCI) ON AN UPLINK TRANSMISSION

CROSS-REFERENCE TO RELATED APPLICATIONS

This application claims the benefit of U.S. Provisional Patent Application No. 63/191,895, entitled, "MULTIPLEXING HIGH PRIORITY AND LOW PRIORITY UPLINK CONTROL INFORMATION (UCI) ON AN UPLINK TRANSMISSION," filed on May 21, 2021, which is expressly incorporated by reference herein in its entirety.

TECHNICAL FIELD

Aspects of the present disclosure relate generally to wireless communication systems, and more particularly, to managing compression of low-priority uplink control information (UCI) multiplexed with high-priority UCI.

Introduction

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining a compression indication for a low-priority (LP) uplink control information (UCI) payload to be multiplexed with a high-priority (HP) UCI payload, encoding the compression indication for the LP UCI payload jointly with the HP UCI payload, encoding the LP UCI payload separately from the jointly-encoded compression indication and HP UCI payload, and multiplexing the encoded LP UCI payload and the jointly-encoded compression indication and HP UCI payload in an uplink transmission to a base station.

In an additional aspect of the disclosure, a method of wireless communication performed by a base station includes receiving, from a UE, a multiplexed uplink transmission that includes a multiplex of an encoded LP UCI payload and an HP UCI payload jointly-encoded with a compression indication for the LP UCI payload, decoding the jointly-encoded HP UCI payload and compression indication to obtain the HP UCI payload and the compression indication, and decoding, based on the compression indication, the LP UCI payload.

In an additional aspect of the disclosure, a method of wireless communication performed by a UE includes determining to multiplex an HP UCI message having a first size and an LP UCI message having a second size for a multiplexed physical uplink control channel (PUCCH) transmission, mapping the HP UCI message to a first set of resource blocks (RBs) to be used for transmitting the HP UCI message of the multiplexed PUCCH transmission, and the LP UCI message to a second set of RBs to be used for transmitting the LP UCI message of the multiplexed PUCCH transmission. In aspects, the second set of RBs is non-overlapping with the first set of RBs. The method further includes generating a first demodulation reference signal (DMRS) to be used for transmitting the first set of RBs, and a second DMRS to be used for transmitting the second set of RBs.

In an additional aspect of the disclosure, a UE includes at least one processor and a memory coupled to the at least one processor. The at least one processor stores processor-readable code that, when executed by the at least one processor, is configured to perform operations including determining a compression indication for an LP UCI payload to be multiplexed with an HP UCI payload, encoding the compression indication for the LP UCI payload jointly with the HP UCI payload, encoding the LP UCI payload separately from the jointly-encoded compression indication and HP UCI payload, and multiplexing the encoded LP UCI payload and the jointly-encoded compression indication and HP UCI payload in an uplink transmission to a base station.

In an additional aspect of the disclosure, a base station includes at least one processor and a memory coupled to the at least one processor. The at least one processor stores processor-readable code that, when executed by the at least one processor, is configured to perform operations including receiving, from a UE, a multiplexed uplink transmission that includes a multiplex of an encoded LP UCI payload and an HP UCI payload jointly-encoded with a compression indication for the LP UCI payload, decoding the jointly-encoded HP UCI payload and compression indication to obtain the HP UCI payload and the compression indication, and decoding, based on the compression indication, the LP UCI payload.

In an additional aspect of the disclosure, a UE includes at least one processor and a memory coupled to the at least one processor. The at least one processor stores processor-readable code that, when executed by the at least one processor, is configured to perform operations including determining to multiplex an HP UCI message having a first size and an LP UCI message having a second size for a multiplexed PUCCH transmission, mapping the HP UCI message to a first set of RBs to be used for transmitting the HP UCI message of the multiplexed PUCCH transmission, and the LP UCI message to a second set of RBs to be used for transmitting the LP UCI message of the multiplexed PUCCH transmission. In aspects, the second set of RBs is non-overlapping with the first set of RBs. The operations further include generating a first DMRS to be used for transmitting the first set of RBs, and a second DMRS to be used for transmitting the second set of RBs.

In an additional aspect of the disclosure, a non-transitory computer-readable medium stores instructions that, when executed by the processor, cause the processor to perform operations. The operations include determining, by a UE, a compression indication for an LP UCI payload to be multiplexed with an HP UCI payload, encoding the compression indication for the LP UCI payload jointly with the HP UCI payload, encoding the LP UCI payload separately from the jointly-encoded compression indication and HP UCI payload, and multiplexing the encoded LP UCI payload and the jointly-encoded compression indication and HP UCI payload in an uplink transmission to a base station.

In an additional aspect of the disclosure, a non-transitory computer-readable medium stores instructions that, when executed by a processor, cause the processor to perform operations. The operations include receiving, by a base station from a UE, a multiplexed uplink transmission that includes a multiplex of an encoded LP UCI payload and an HP UCI payload jointly-encoded with a compression indication for the LP UCI payload, decoding the jointly-encoded HP UCI payload and compression indication to obtain the HP UCI payload and the compression indication, and decoding, based on the compression indication, the LP UCI payload.

In an additional aspect of the disclosure, a non-transitory computer-readable medium stores instructions that, when executed by a processor, cause the processor to perform operations. The operations include determining, by a UE, to multiplex an HP UCI message having a first size and an LP UCI message having a second size for a multiplexed PUCCH transmission, mapping the HP UCI message to a first set of RBs to be used for transmitting the HP UCI message of the multiplexed PUCCH transmission, and the LP UCI message to a second set of RBs to be used for transmitting the LP UCI message of the multiplexed PUCCH transmission. In aspects, the second set of RBs is non-overlapping with the first set of RBs. The operations further include generating a first DMRS to be used for transmitting the first set of RBs, and a second DMRS to be used for transmitting the second set of RBs.

In an additional of the disclosure, an apparatus includes means for determining, by a UE, a compression indication for an LP UCI payload to be multiplexed with an HP UCI payload, means for encoding the compression indication for the LP UCI payload jointly with the HP UCI payload, means for encoding the LP UCI payload separately from the jointly-encoded compression indication and HP UCI payload, and means for multiplexing the encoded LP UCI payload and the jointly-encoded compression indication and HP UCI payload in an uplink transmission to a base station.

In an additional aspect of the disclosure, an apparatus includes means for receiving, by a base station from a UE, a multiplexed uplink transmission that includes a multiplex of an encoded LP UCI payload and an HP UCI payload jointly-encoded with a compression indication for the LP UCI payload, means for decoding the jointly-encoded HP UCI payload and compression indication to obtain the HP UCI payload and the compression indication, and means for decoding, based on the compression indication, the LP UCI payload.

In an additional aspect of the disclosure, an apparatus includes means for determining to multiplex an HP UCI message having a first size and an LP UCI message having a second size for a multiplexed PUCCH transmission, and means for mapping the HP UCI message to a first set of RBs to be used for transmitting the HP UCI message of the multiplexed PUCCH transmission, and the LP UCI message to a second set of RBs to be used for transmitting the LP UCI message of the multiplexed PUCCH transmission. In aspects, the second set of RBs is non-overlapping with the first set of RBs. The apparatus further includes means for generating a first DMRS to be used for transmitting the first set of RBs, and a second DMRS to be used for transmitting the second set of RBs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
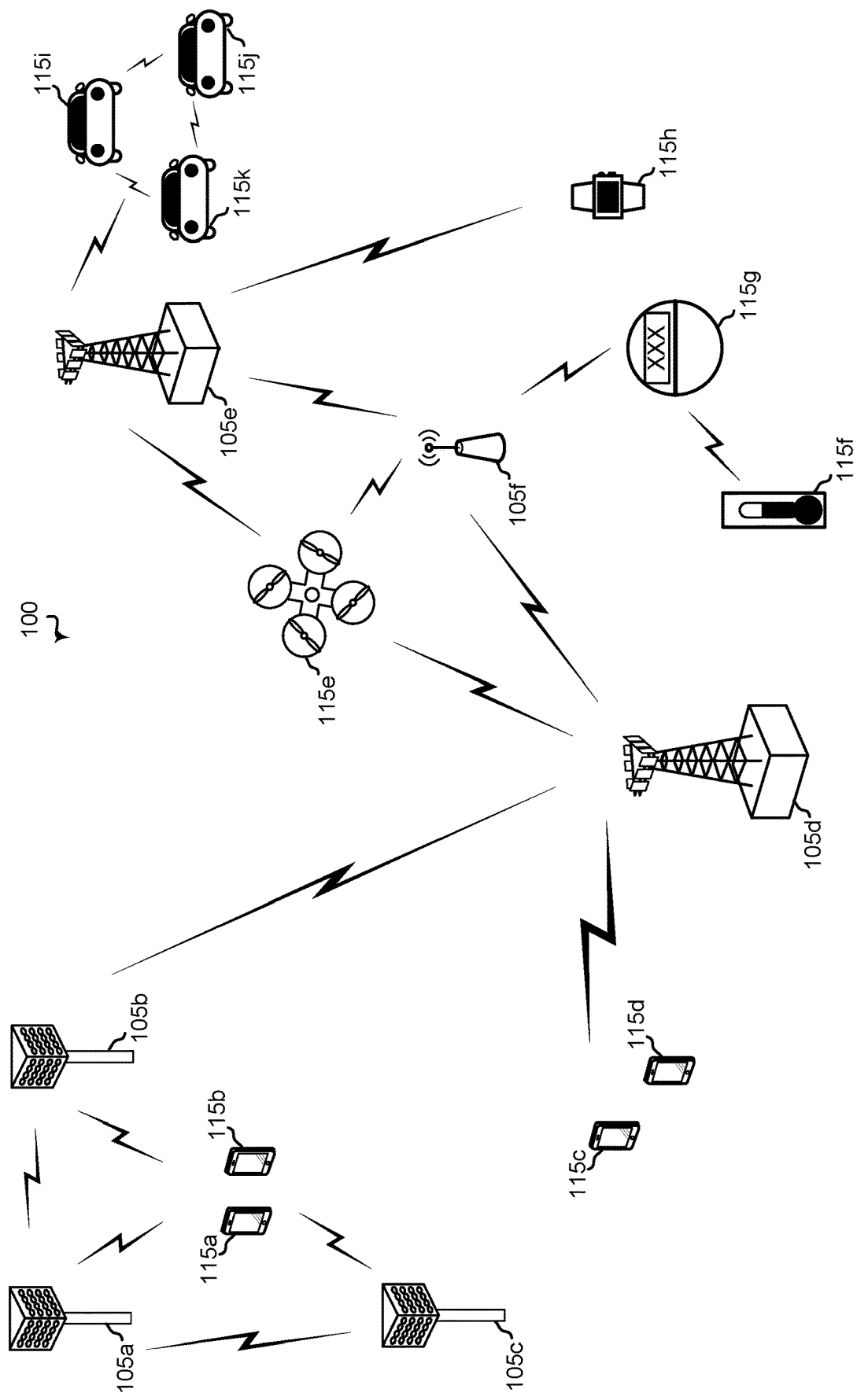
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects of the present disclosure relate to techniques that provide a mechanism for managing compression and compression indications of a low-priority (LP) uplink control information (UCI) message that is multiplexed with a high-priority (HP) UCI message in a wireless communication system. In particular, in aspects of the present disclosure, a UE may be configured or scheduled to multiplex an HP UCI message and an LP UCI message for a multiplexed uplink (e.g., a physical uplink control channel (PUCCH) or physical uplink shared channel (PUSCH)) transmission. The UE may determine a compression indication for the LP UCI message, which may include determining to reduce the size of the LP UCI message to be multiplexed with the HP UCI message. In aspects, determining the compression indication for the LP UCI message may include the UE determining whether to reduce the size of the LP UCI message before multiplexing, and/or determining a manner for reducing the size of the size of the LP UCI message. In some aspects, reducing the size of the LP UCI message may include compressing, partially dropping, and/or bundling the LP UCI message. The UE may encode the compression indication jointly with the HP UCI message. The LP UCI message may then be encoded separately from the jointly-encoded compression indication and HP UCI message. In some aspects, the reduction of the size of the LP UCI message may be performed prior to the encoding of the LP UCI message. The separately encoded LP UCI message and the jointly-encoded compression indication and HP UCI message may be multiplexed for the multiplexed uplink transmission, which may be transmitted to the base station. The base station may then decode the jointly-encoded compression indication and HP UCI message to obtain the compression indication for the LP UCI message. The base station may then decode the LP UCI message (if appropriate) based on the compression indication.

In some aspects of the present disclosure, a UE may be configured or scheduled to multiplex an HP UCI message and an LP UCI message for a multiplexed uplink (e.g., PUCCH or PUSCH) transmission. The UE may be configured to map the HP UCI message to a first set of resource blocks (RBs) and the LP UCI message to a second set of RBs. In aspects, the first set of RBs and the second set of RBs may be non-overlapping and/or may be different. The size of the first set of RBs (e.g., the number of RBs in the first set) may be based on the size of the HP UCI message and a corresponding coding rate. The UE may be configured to generate a first demodulation reference signal (DMRS) for the first set of RBs based on the number of RBs in the first set of RBs, and a second DMRS for the second set of RBs based on the number of RBs in the second set of RBs. The UE may transmit the multiplexed uplink transmission by transmitting the HP UCI message over the first set of RBs and the LP UCI message over the second set of RBs.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, or backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
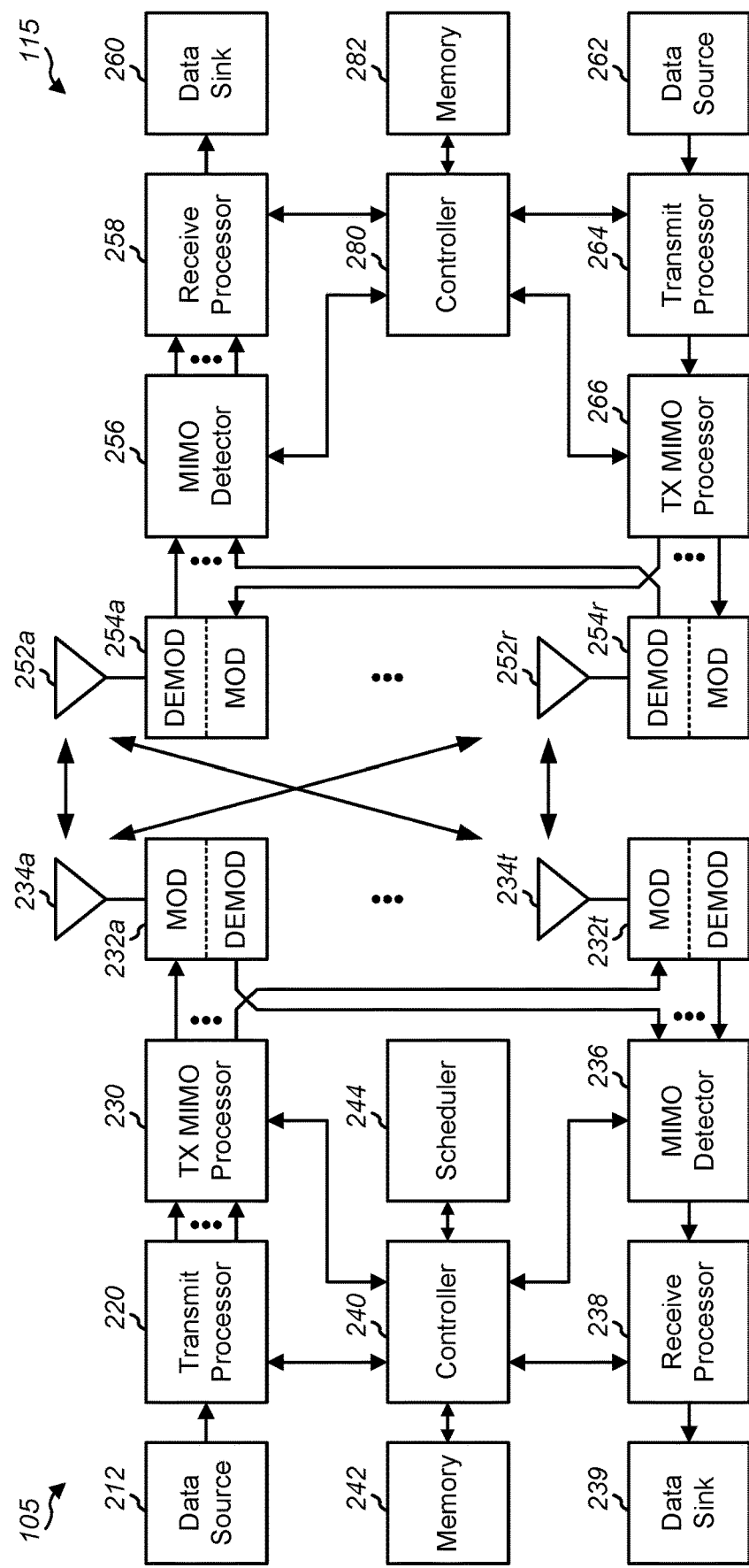
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5-7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems may transmit traffic of various and different priorities. For example, in some implementations, a UE may transmit high-priority (HP) uplink control information (UCI) as well as low-priority UCI. In some earlier implementations of wireless communication systems, there was no differentiation between HP UCI and LP UCI in the physical layer, but in more recent implementations, UCI may be HP UCI or LP UCI. In situations in which collisions between HP UCI and LP UCI may occur (e.g., when a PUCCH or PUSCH resource in which the UE may be scheduled to transmit the HP UCI message collides in time with the PUCCH or PUSCH resource in which the UE may be scheduled to transmit the LP UCI message), the UE may be configured to multiplex the HP UCI payload and the LP UCI payload on a same PUCCH or PUSCH resource. These implementations may be designed with a focus on ensuring reliability of the HP transmissions, while not always dropping the LP transmissions when a collision between HP and LP traffic occurs. For example, in some cases, the UE may separately encode the HP UCI message and the LP UCI message, using different coding rates, in order to provide unequal error protection (e.g., in order to provide a higher error protection to the HP UCI transmissions) and may transmit the multiplexed UCI on a PUCCH or PUSCH resource configured for the multiplexed transmission.

However, in some cases, the total resources on the PUCCH or PUSCH may be limited. For example, there may be limited resource for the multiplexed PUCCH or PUSCH transmission that includes the multiplexed UCI. Because of this, it may not always be possible to reliably transmit all of the HP UCI message and all of the LP UCI message to a base station. In these cases, the UE may partially compress (or in some cases drop) the LP UCI to a smaller payload size that may be transmitted over the limited resources. It is noted that the techniques described herein focus on a discussion of "compressing" the LP UCI message into a smaller payload size. However, it should be appreciated that the same techniques may be applicable when partially "dropping" the LP UCI message to obtain a smaller size, or to any other situation in which the LP UCI message is shortened or made smaller due to the limited resources for the multiplexed UCI transmission. Also, although the description herein focuses on a transmission of the multiplexed UCI over a PUCCH resource, the same techniques may be applicable when transmitting the multiplexed UCI over a PUSCH resource.

In some implementations, the compression (or in some cases dropping) ratio of the LP UCI message to be multiplexed with the HP UCI message may be controlled by a base station based on the amount of resource elements (REs) and coding rates configured for a particular PUCCH (or PUSCH) resource in which the LP UCI message is to be multiplexed with the HP UCI message and transmitted from the UE to the base station. In these cases, the base station and the UE may both determine the same compression (or dropping) ratio for the LP UCI message, such as based on a common compression (or dropping) rule. As the base station knows the compression ratio for the LP UCI message that is to be transmitted by the UE, the base station also knows the number of LP UCI bits that may be transmitted on the multiplexed PUCCH (or PUSCH) resource from the UE. In these cases, the base station may receive and decode the HP UCI message and the LP UCI message, as the base station knows how many LP UCI bits are transmitted in the multiplexed UCI transmission.

However, in some cases, it may be beneficial to allow the UE to decide the compression ratio and/or the compression rule, and to indicate either or both to the base station. For example, in some cases, the base station may not be aware of the transmit power that the UE may use when transmitting the multiplexed PUCCH that includes the multiplexed UCI message. More specifically, according to the power control mechanism specified in the standards (e.g., 3GPP standards), the transmit power to be used by the UE when transmitting a UCI message is proportional to the number of bits to be transmitted for the UCI message (e.g., based on the UCI payload size and a coding rate). For example, the higher the number of UCI bits to be transmitted, the higher the transmit power to be used by the UE when transmitting the PUCCH transmission that includes the UCI bits, in order to ensure a desired reliability for both HP UCI and LP UCI. Still, the UE may be configured with a maximum transmit power $P_{C,max}$ that the UE may not to exceed. In these cases, when the scheduled transmit power to be used by the UE for transmitting a PUCCH transmission exceeds the maximum transmit power $P_{C,max}$ of the UE, the UE may cap the PUCCH transmission and only transmit at $P_{C,max}$ power, thereby resulting in a received power of the PUCCH transmission at the base station that is insufficient to reliably decode the multiplexed UCI message. This insufficient received power at the base station may impact the reliability of both the HP UCI and LP UCI. In this case, it may be beneficial to allow the UE to determine how many UCI bits to transmit in the multiplexed PUCCH transmission (e.g., how much to compress or drop the LP UCI message) based on a current power headroom. In this manner, the UE may not perform additional compression when there is sufficient transmit power (e.g., when the scheduled transmit power of the multiplexed PUCCH transmission is less than $P_{C,max}$) for transmitting the multiplexed PUCCH transmission, and may perform additional compression when there is not sufficient transmit power (e.g., when the scheduled transmit power of the multiplexed PUCCH transmission exceeds $P_{C,max}$) for transmitting the multiplexed PUCCH transmission.

It is noted that, there is a mechanism in current implementations of wireless communication systems that is used to report a power headroom to a base station from a UE in order to indicate to the base station a power headroom at the UE. In these cases, a power headroom report is provided to the base station (e.g., periodically or based on some event) indicating how much power is left at the UE for uplink transmissions. The base station may keep track of the power headroom at the UE and may make scheduling decisions for uplink transmissions from the UE based on the power headroom report. However, the power headroom reports are typically very slow in comparison to the latency/reliability requirements of HP communications (e.g., including HP UCI).

Various aspects of the present disclosure relate to techniques that provide a mechanism for managing compression and compression indications of a low-priority UCI message that is multiplexed with a high-priority UCI message in a wireless communication system. In particular, in aspects of the present disclosure, a UE may be configured or scheduled to multiplex an HP UCI message and an LP UCI message for a multiplexed uplink (e.g., PUCCH or PUSCH) transmission. The UE may determine a compression indication for the LP UCI message, which may include determining to reduce the size of the LP UCI message to be multiplexed with the HP UCI message. In aspects, determining the compression indication for the LP UCI message may include the UE determining whether to reduce the size of the LP UCI message before multiplexing, and/or determining a manner for reducing the size of the size of the LP UCI message. In some aspects, reducing the size of the LP UCI message may include compressing, partially dropping, and/or bundling the LP UCI message. The UE may encode the compression indication jointly with the HP UCI message. The LP UCI message may then be encoded separately from the jointly-encoded compression indication and HP UCI message. In some aspects, the reduction of the size of the LP UCI message may be performed prior to the encoding of the LP UCI message. The separately encoded LP UCI message and the jointly-encoded compression indication and HP UCI message may be multiplexed for the multiplexed uplink transmission, which may be transmitted to the base station. The base station may then decode the jointly-encoded compression indication and HP UCI message to obtain the compression indication for the LP UCI message. The base station may then decode the LP UCI message (if appropriate) based on the compression indication.

In some aspects of the present disclosure, a UE may be configured or scheduled to multiplex an HP UCI message and an LP UCI message for a multiplexed uplink (e.g., PUCCH or PUSCH) transmission. The UE may be configured to map the HP UCI message to a first set of resource blocks (RBs) and the LP UCI message to a second set of RBs. In aspects, the first set of RBs and the second set of RBs may be non-overlapping and/or may be different. The size of the first set of RBs (e.g., the number of RBs in the first set) may be based on the size of the HP UCI message and a corresponding coding rate. The UE may be configured to generate a first demodulation reference signal (DMRS) for the first set of RBs based on the number of RBs in the first set of RBs, and a second DMRS for the second set of RBs based on the number of RBs in the second set of RBs. The UE may transmit the multiplexed uplink transmission by transmitting the HP UCI message over the first set of RBs and the LP UCI message over the second set of RBs.

Figure 3:
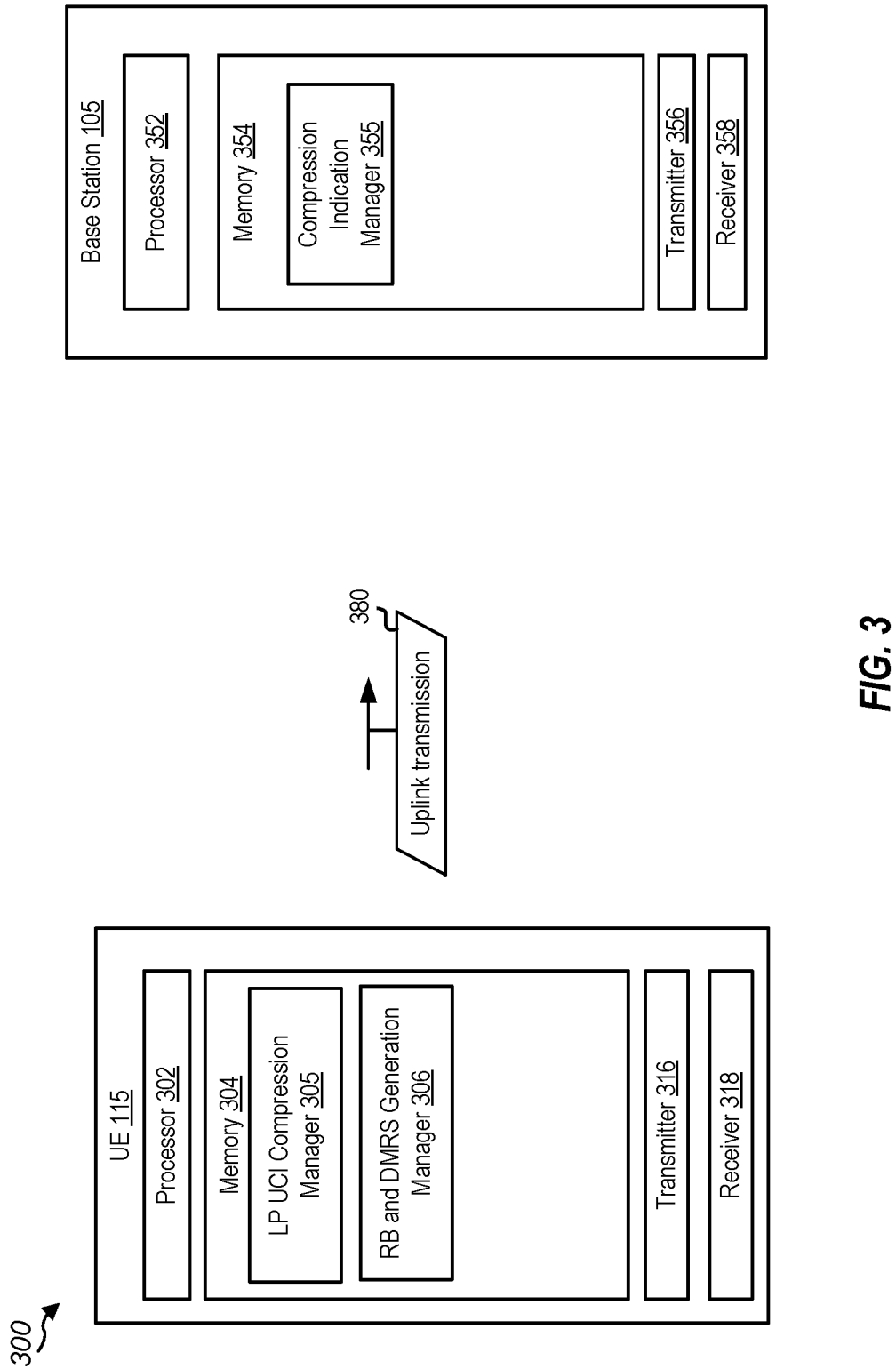
FIG. 3 is a block diagram illustrating an example wireless communication system that supports managing compression and compression indications of a low-priority uplink control information (UCI) message that is multiplexed with a high-priority UCI message according to one or more aspects.

FIG. 3 is a block diagram of an example wireless communications system 300 that supports managing compression and compression indications of a low-priority UCI message that is multiplexed with a high-priority UCI message in a wireless communication system according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105 and/or other network entities.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to LP UCI compression manager 305 RB and DMRS generation manager 306. In aspects, LP UCI compression manager 305 may be configured to perform operations for determining whether to reduce the size of the LP UCI message, for determining a compression type (e.g., compression, partial drop, bundling, etc.), for determining and/or generating a compression indication, for jointly encoding the compression indication and the HP UCI message, and/or for separately encoding the LP UCI message from the jointly-encoded compression indication and HP UCI message in accordance with aspects of the present disclosure.

In aspects, RB and DMRS generation manager 306 may be configured to perform operations for mapping the HP UCI message to a first set of RBs and the LP UCI message to a second set of RBs, and for generating a first DMRS for the first set of RBs and a second DMRS for the second set of RBs in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store compression indication manager 355. In aspects, compression indication manager 355 may be configured to perform operations for decoding a compression indication (e.g., from a jointly-encoded compression indication and HP UCI message) and to decode an LP UCI message based on the compression indication in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, UE 115 determines to multiplex an HP UCI message and an LP UCI message together. For example, an uplink resource (e.g., a PUCCH or PUSCH resource) in which UE 115 may be scheduled to transmit the HP UCI message may collide in time with a PUCCH resource in which UE 115 may be scheduled to transmit the LP UCI message. Due to this collision, UE 115 may determine to multiplex the HP UCI message and the LP UCI message in a same uplink resource (e.g., a multiplexed uplink resource for transmitting a multiplexed uplink transmission 380 including a multiplex of the LP UCI message and the HP UCI message). The HP UCI message may have a first HP UCI payload size, and the LP UCI message may have a second LP UCI payload size.

In aspects, the UCI included in either or both of the HP UCI message and the LP UCI message may include one or more of various types of UCI. The various types of UCI may include hybrid automatic repeat request (HARQ) feedback, a scheduling request (SR) message, low-priority channel state information (CSI) and/or high-priority CSI, etc.

During operation of wireless communications system 300, UE 115 determines a compression indication for the LP UCI message that is to be multiplexed with the HP UCI message. In aspects, determining the compression indication may include determining whether to reduce the size of the LP UCI message before multiplexing the LP UCI message with the HP UCI message, and including related information in the compression indication (e.g., whether a reduction of the LP UCI message has been performed, what manner of reduction was performed by UE 115, etc.). For example, UE 115 may be configured with a maximum transmit power $P_{C,max}$. UE 115 may determine that the scheduled transmit power for the multiplexed uplink transmission carrying the multiplexed HP UCI message and LP UCI message may exceed the maximum transmit power $P_{C,max}$ of UE 115. In this case, UE 115 may determine to reduce the size of the multiplexed UCI message by reducing the size of the LP UCI message being multiplexed with the HP UCI message. It is noted that in this case, the HP UCI message is not reduced because reducing the HP UCI message may impact the HP communication which may require high levels of reliability and low levels of latency.

In these aspects, when the scheduled transmit power for the multiplexed uplink transmission carrying the multiplexed HP UCI message and LP UCI message may exceed the maximum transmit power $P_{C,max}$ of UE 115, UE 115 may reduce the size of the LP UCI message by compressing the LP UCI message (e.g., applying a compression algorithm to the LP UCI message payload) until a scheduled transmit power associated with the compressed LP UCI message and the HP UCI message is below the maximum transmit power $P_{C,max}$ of UE 115. For example, UE 115 may compress the LP UCI message a first time to generate a first compressed LP UCI message. UE 115 may calculate a scheduled transmit power for transmitting a multiplexed uplink transmission including the HP UCI message and the first compressed LP UCI message. If the scheduled transmit power for transmitting the multiplexed uplink transmission including the HP UCI message and the first compressed LP UCI message is below the maximum transmit power $P_{C,max}$ of UE 115, UE 115 may proceed to multiplex the HP UCI message and the first compressed LP UCI message, as described in more detail below, and may transmit the multiplex uplink transmission to base station 105 using the calculated transmit power. However, if the scheduled transmit power for transmitting the multiplexed uplink transmission including the HP UCI message and the first compressed LP UCI message is above the maximum transmit power $P_{C,max}$ of UE 115, UE 115 may continue to compress the LP UCI message until the scheduled transmit power for transmitting the multiplexed uplink transmission including the HP UCI message and the compressed LP UCI message falls below the maximum transmit power $P_{C,max}$ of UE 115. For example, UE 115 may further compress the first compressed LP UCI message to generate a second compressed LP UCI message. UE 115 may calculate a scheduled transmit power for transmitting a multiplexed uplink transmission including the HP UCI message and the second compressed LP UCI message. If the scheduled transmit power for transmitting the multiplexed uplink transmission including the HP UCI message and the second compressed LP UCI message is below the maximum transmit power $P_{C,max}$ of UE 115, UE 115 may proceed to multiplex the HP UCI message and the second compressed LP UCI message, as described in more detail below, and may transmit the multiplex uplink transmission to base station 105 using the calculated transmit power. In some aspects, UE 115 may continue to compress the LP UCI message until no LP UCI is include in the compressed LP UCI message to be multiplexed (e.g., until the size of the compressed LP UCI message is zero). For example, if compressing the LP UCI message does not yield a scheduled transmit power for the multiplexed uplink transmission that is below the maximum transmit power $P_{C,max}$ of UE 115, UE 115 may continue to compress the LP UCI message until there is no more LP UCI message to be compressed. At this point, an LP UCI message may not be multiplexed with the HP UCI message.

In alternative or additional aspects, UE 115 may determine whether to reduce the size of the LP UCI message before multiplexing the LP UCI message with the HP UCI message by determining whether a channel between UE 115 and base station 105 to which the uplink transmission 380 is being transmitted is blocked. When the channel between UE 115 and base station 105 to which the uplink transmission 380 is being transmitted is determined to be blocked, UE 115 may determine to reduce the LP UCI message being multiplexed with the HP UCI message. In some aspects, UE 115 may reduce the size of the LP UCI message by dropping or discarding at least a portion of the LP UCI message. In some aspects, the portion being dropped may be smaller than that the size of the LP UCI message, or may include the entire LP UCI message. These aspects of the present disclosure may be applicable in implementations using frequency range 2 (FR2).

In alternative or additional aspects, UE 115 may determine whether to reduce the size of the LP UCI message before multiplexing the LP UCI message with the HP UCI message by determining whether the total number of resources scheduled for the multiplexed uplink transmission carrying the multiplexed HP UCI message and LP UCI message is insufficient to convey or transport all of the HP UCI message and/or all of the LP UCI message. For example, in aspects, a set of resources may be allocated or scheduled for transmitting the multiplexed uplink transmission carrying the multiplexed HP UCI message and LP UCI message to base station 105. UE 115 may determine that the set of resource is not sufficient for transmitting the multiplexed UCI payload, as the size of the multiplexed UCI payload may include the HP UCI message and/or the LP UCI message together. In this case, UE 115 may determine to reduce the size of the multiplexed UCI message by reducing the size of the LP UCI message being multiplexed.

In aspects, when the total number of resources scheduled for the multiplexed uplink transmission carrying the multiplexed HP UCI message and LP UCI message is insufficient to convey or transport all of the HP UCI message and/or all of the LP UCI message, UE 115 may reduce the size of the LP UCI message by compressing the LP UCI message (e.g., applying a compression algorithm to the LP UCI message payload) to a number of bits that may be carried in the total number of resources scheduled for the multiplexed uplink transmission. For example, UE 115 may determine to compress the LP UCI message to a first number of bits based on the scheduled coding rate of the LP UCI message on the uplink transmission resource, as well as based on the number of resources that may be used for the HP UCI message. It is noted that in this case, the HP UCI message is not compressed or reduced at all. UE 115 may then compress the LP UCI message to the first number of bits calculated in accordance with the preceding.

In aspects, as noted above, determining the compression indication may include including related information in the compression indication. It is noted that without a compression indication (e.g., an indication that the LP UCI message is compressed, and the compression rule and/or manner in which the LP UCI message is compressed), the base station may not be able to decode the LP UCI, since the base station may not be aware whether and/or how the LP UCI may be compressed.

In aspects, the related information may include a compression ratio of the LP UCI message. For example, UE 115 may determine to compress the LP UCI message to a compressed LP UCI message size. UE 115 may calculate a compression ratio of the number of LP UCI message bits prior to the compression to the number of LP UCI message bits after the compression (e.g., the compressed LP UCI message size). UE 115 may include the compression ratio in the compression indication to be sent to base station 105.

In some aspects, the related information may include a size (e.g., a number of bits) of the LP UCI payload after compression. For example, UE 115 may determine to compress the LP UCI message to a compressed LP UCI message size. UE 115 may include the compressed LP UCI message size in the compression indication to be sent to base station 105. In some aspects, UE 115 may use the compressed LP UCI message size to indicate to base station 105 whether or not the multiplexed uplink transmission includes any LP UCI payload bits. For example, UE 115 may include a non-zero compressed LP UCI message size in the compression indication to indicate to base station 105 that the multiplexed uplink transmission includes LP UCI message payload bits. On the other hand, UE 115 may include a zero for the compressed LP UCI message size in the compression indication to indicate to base station 105 that the multiplexed uplink transmission includes no LP UCI message payload bits.

In some aspects, the related information may include a type of compression or reduction that UE 115 may apply to reduce the LP UCI message prior to the multiplexing. For example, as noted above, UE 115 may reduce the size of the LP UCI message by applying compression (e.g., applying a compression algorithm), by dropping at least a portion of the LP UCI message, or by bundling the LP UCI message. For example, bundling the LP UCI message may include, when the LP UCI message includes a HARQ feedback message, more than one HARQ feedback bits may be bundled into one HARQ feedback bit (e.g., across code block groups (CBGs)).

During operation of wireless communications system 300, UE 115 jointly encodes the compression indication and the HP UCI message. For example, UE 115 may encode the compression indication obtained in accordance with aspects of the present disclosure and the HP UCI message together to generate a jointly-encoded message that includes the compression indication and the HP UCI message. In aspects, UE 115 jointly encodes the compression indication and the HP UCI message using a first coding rate. In aspects, the first coding rate may be associated with a scheduled coding rate associated with the HP UCI message for the multiplexed uplink transmission resource.

During operation of wireless communications system 300, UE 115 may apply the compression indication to the LP UCI message. For example, UE 115 may reduce the LP UCI message as described above, when UE 115 determines to reduce the LP UCI message in accordance with aspects of the present disclosure described herein. For example, UE 115 may reduce the LP UCI message size by compressing the LP UCI message (e.g., using a compression algorithm), dropping at least a portion of the LP UCI message before multiplexing the LP UCI message with the HP UCI message, and/or bundling more than one bit of the LP UCI message into one bit of the LP UCI message. For example, when the LP UCI message includes a HARQ feedback message, bundling multiple HARQ feedback bits into one HARQ feedback bit may include UE 115 setting the bundled bit to be an acknowledgement (ACK) when all of the multiple HARQ feedback bits are ACK, and/or UE 115 setting the bundled bit to be an non-ACK (NACK) when any of the multiple HARQ feedback bits are a NACK.

In some aspects, UE 115 may determine not to reduce the LP UCI message at all (and in these cases the compression indication may indicate that no reduction (e.g., no compression, no dropping, and/or no bundling), has been performed by UE 115). The resulting reduced LP UCI message, or in some cases the non-reduced LP UCI message, may be encoded before being multiplexed with the HP UCI message. In a particular example, the compression indication may include a one-bit indication indicating whether any bits of the LP UCI message are included in the multiplexed uplink transmission or not. In this case, the compression ratio may indicate either 0 (e.g., no LP UCI bits) or 1 (e.g., at least one LP UCI bit).

During operation of wireless communications system 300, UE 115 encodes the LP UCI message (e.g., the reduced or unreduced LP UCI message). For example, UE 115 may encode the compressed, partially dropped, and/or bundled LP UCI message separately from the joint encoding of the compression indication and the HP UCI message. In some cases, such as when the LP UCI message is not reduced (e.g., not reduced by compression, partial dropping, and/or bundling), UE 115 may encode the unreduced LP UCI message separately from the joint encoding of the compression indication and the HP UCI message LP UCI message. In these aspects, UE 115 may encode the LP UCI message using a second coding rate. In some aspects, the second coding rate may be associated with a scheduled coding rate associated with the LP UCI message for the multiplexed uplink transmission resource. In some aspects, the second coding rate may be different from the first coding rate used for jointly encoding the compression indication and the HP UCI message.

During operation of wireless communications system 300, UE 115 multiplexes together, on the uplink transmission resource, the encoded LP UCI message and the jointly-encoded message that includes a joint encoding of the HP UCI message and the compression indication. For example, after determining a set of resources on which to multiplex the encoded LP UCI message and the jointly-encoded message that includes a joint encoding of the HP UCI message and the compression indication, UE 115 may generate multiplexed uplink transmission 380 by multiplexing the encoded LP UCI message and the jointly-encoded message that includes a joint encoding of the HP UCI message and the compression indication on the set of resources determined by UE 115. During operation of wireless communications system 300, UE 115 transmits multiplexed uplink transmission 380 to base station 105.

During operation of wireless communications system 300, base station 105 receives multiplexed uplink transmission 380 from UE 115. In aspects, multiplexed uplink transmission 380 may include the encoded LP UCI message and the jointly-encoded message that includes a joint encoding of the HP UCI message and the compression indication. In aspects, base station 105 may first decode the jointly-encoded message that includes a joint encoding of the HP UCI message and the compression indication to obtain the HP UCI message and the compression indication. As noted above, the compression indication may include information and indications about any size reduction of the LP UCI message transmitted from UE 115 in multiplexed uplink transmission 380. For example, as noted above, the compression indication may include an indication of whether the LP UCI message was reduced before multiplexing (e.g., by compression, partial dropping, and/or bundling) as well as information on compression ratios used for the LP UCI message, type of compression used on the LP UCI message, number of bits in the LP UCI message, etc. Thus, UE 115 may obtain compression information about the LP UCI message in multiplexed uplink transmission 380 from the compression indication. During operation of wireless communications system 300, base station 105 decodes the LP UCI message in multiplexed uplink transmission 380 based on the compression indication obtained from the jointly-encoded HP UCI message and compression indication.

Figure 4:
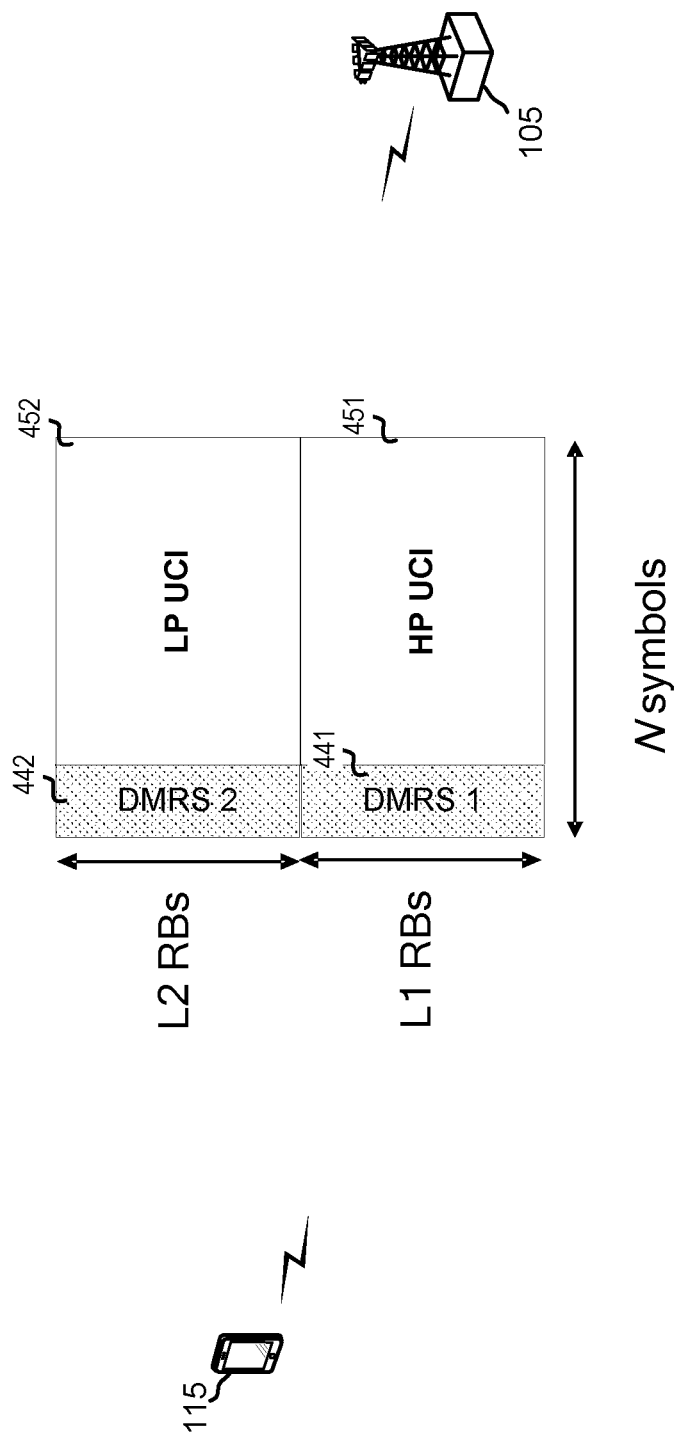
FIG. 4 is a block diagram illustrating an example wireless communication system that supports non-overlapping resource block allocation and priority-specific demodulation reference signal (DMRS) assignment for multiplexed UCI messages of different priorities according to one or more aspects.

FIG. 4 is a block diagram illustrating an example wireless communication system that supports non-overlapping resource block allocation and priority-specific DMRS assignment for multiplexed UCI messages of different priorities according to one or more aspects of the present disclosure. The techniques that are described herein with respect to FIG. 4 may be advantageous when addressing problems that arise from a potential misalignment in the UCI payload size expected by the base station and the UCI payload size actually sent by the UE. Typically, a payload size of a UCI (and the size of the PUCCH resource in which the UCI may be transmitted to the base station) is determined by the number of downlink grants that the UE may receive prior to transmitting the UCI message include feedback (e.g., HARQ feedback). For example, when a UE receives five downlink grants for five PDSCH transmissions from the base station, the base station may expect, and the UE may report, five HARQ feedback bits, typically. However, for HP and LP UCI reporting, associated downlink grants may be counted separately. More specifically, the payload size of a HARQ-ACK codebook may be determined by the corresponding DCI. For example, the UE may receive three LP downlink grants (e.g., eMBB downlink grant) even though the base station may transmit four LP downlink grants. This is because LP communication may be less reliable (e.g., bad channel or wrong decoding). In this case then, the base station may expect an LP HARQ feedback codebook that includes four bits, but the UE may report an LP HARQ feedback codebook that includes only three bits. Without multiplexing the HP UCI with the LP UCI, this may not present a significant problem for the system. However, when the LP UCI is multiplexed with the HP UCI, this misalignment between the base station and the UE with respect to the LP communication may affect the HP UCI traffic. For example, the UE may determine a total UCI payload size for the multiplexed UCI based on the incorrect LP UCI size, and may select a PUCCH resource based on the incorrectly computed total multiplexed UCI payload size. The base station may determine a different PUCCH resource, as the base station determines a different total multiplexed UCI payload size, thereby creating mismatch that may affect the HP transmission. It is noted that the above issue may arise when the LP UCI (e.g., HARQ feedback) is configured with a Type-2 HARQ feedback codebook (also known as dynamic HARQ feedback codebook).

Some solutions have been proposed for addressing the above problems. In one particular solution, the HP UCI message and the LP UCI message may be multiplexed (e.g., frequency-division multiplexed) on different RBs of the PUCCH resource when the PUCCH format is format 2 or format 3. This solution ensures that even if the base station and the UE do not agree on the LP UCI payload size, the HP UCI message may still be decoded properly, as long as both the UE and the base station know the correct HP UCI message size, since the number of RBs used to transmit the HP UCI message depends on the HP UCI payload size, and not on the LP UCI payload size.

In implementations, when the multiplexed HP UCI message and LP UCI message are transmitted via a PUCCH resource with PUCCH format 2, then the UE may generate a single DMRS sequence whose length may be determined by the total number of RBs of the PUCCH. In this case, the DMRS that may be transmitted on RBs containing the HP UCI message only may depend on the index of these RBs, and may be independent of the number of RBs (or the associated indices) used to transmit the LP UCI message. However, there is a problem that arises with this approach when using PUCCH format 3. In this case, a DMRS sequence of the entire PUCCH transmission may be dependent on the number of RBs that are used to transmit each of the LP UCI message and the HP UCI message. Thus, in this case, even if the UE and base station have an understanding of the number of RBs for the HP UCI message, there may be problems when determining the DMRS sequence used for the PUCCH format 3.

Aspects of the present disclosure provide systems and methods that support non-overlapping resource block allocation and priority-specific DMRS assignment for multiplexed UCI messages of different priorities. As shown in FIG. 4, UE 115 may determine to multiplex HP UCI message 451 and LP UCI message 452 to be transmitted in a multiplexed uplink resource that includes N symbols and L1+L2 RBs.

In aspects, UE 115 may map HP UCI message 451 to a first set of RBs that includes L1 RBs, and may map LP UCI message 452 to a second set of RBs that includes L2 RBs. In aspects, the first set of RBs and the second set of RBs may be non-overlapping and/or may be different. In aspects, the number of RBs L1 in the first set of RBs may be based on the size of HP UCI message 451, and may not depend on the size of LP UCI message 452. In addition, the number of RBs L1 in the first set of RBs may be based on the coding rate associated with the HP UCI message transmission within the uplink transmission.

In aspects, UE 115 may generate a first DMRS sequence to be used for transmitting the first set of RBs for the HP UCI message. UE 115 may also generate a second DMRS sequence to be used for transmitting the second set of RBs for the LP UCI message. In aspects, the first DMRS sequence may be generated based on the number of RBs in the first set of RBs for transmitting the HP UCI message, and the second DMRS sequence may be generated based on the number of RBs in the second set of RBs for transmitting the LP UCI message.

In aspects, UE 115 may transmit the HP UCI message of the multiplexed uplink transmission in the first set of RBs, and may transmit the LP UCI message of the multiplexed uplink transmission in the second set of RBs.

Figure 5:
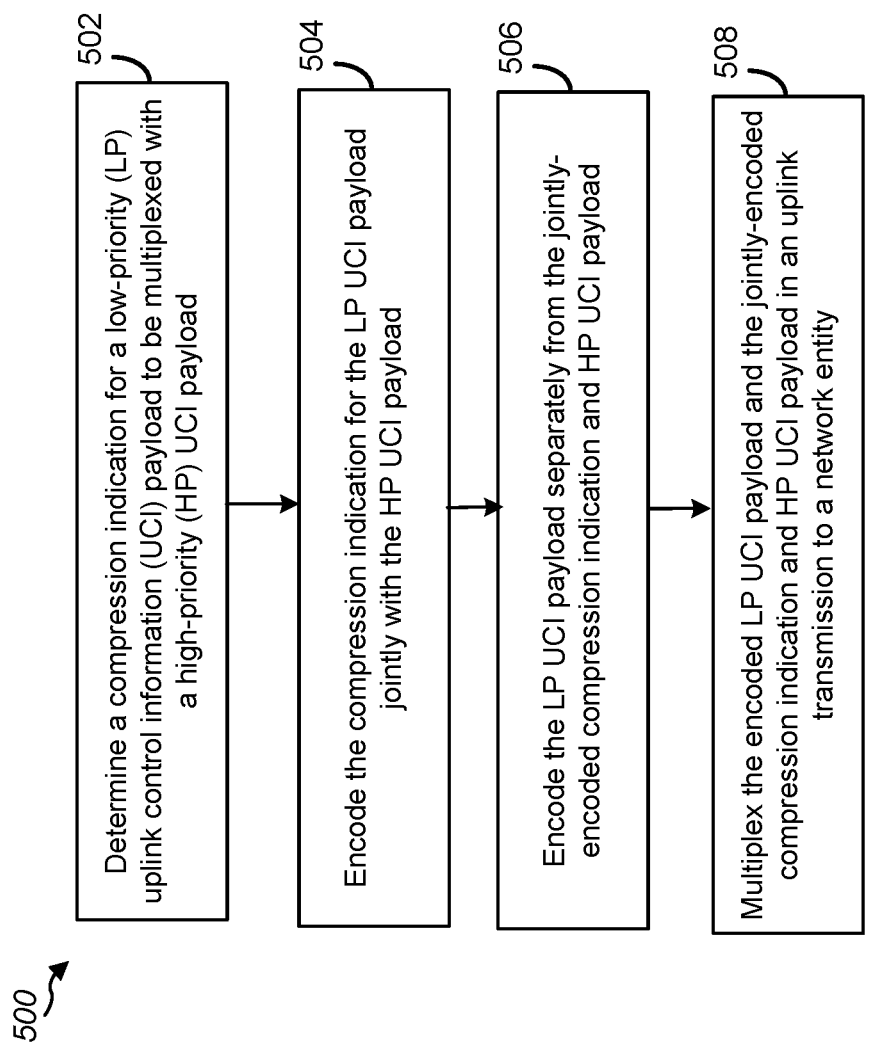
FIG. 5 is a flow diagram illustrating an example process that supports managing compression and compression indications of a low-priority UCI message that is multiplexed with a high-priority UCI message according to one or more aspects.
Figure 8:
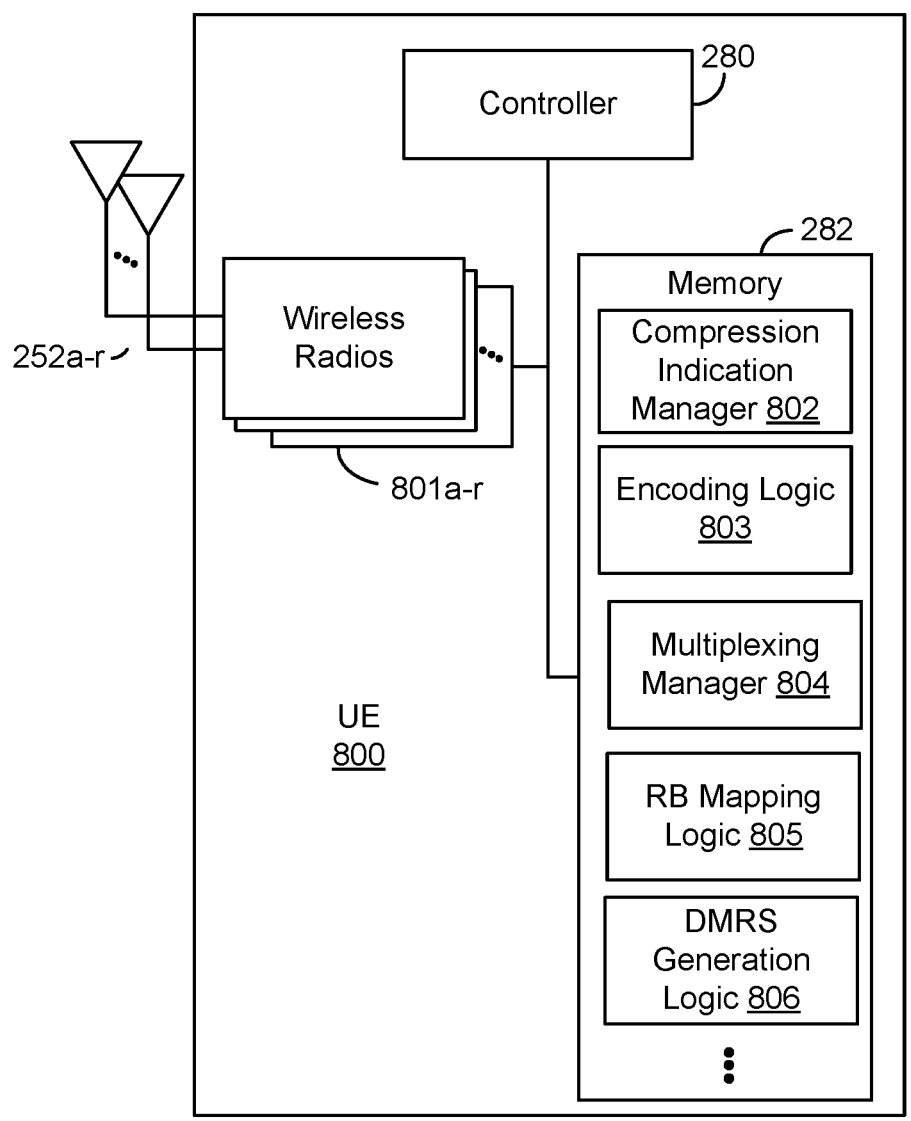
FIG. 8 is a block diagram of an example UE that supports managing compression and compression indications of a low-priority UCI message that is multiplexed with a high-priority UCI message according to one or more aspects.

FIG. 5 is a flow diagram illustrating an example process 500 that supports managing compression and compression indications of an LP UCI message that is multiplexed with an HP UCI message in a wireless communication system according to one or more aspects. Operations of process 500 may be performed by a UE, such as UE 115 described above with reference to FIGS. 1-4, or UE 800 described with reference to FIG. 8. For example, example operations (also referred to as "blocks") of process 500 may enable UE 115 to support managing compression and compression indications of an LP UCI message that is multiplexed with an HP UCI message. FIG. 8 is a block diagram illustrating UE 800 configured according to aspects of the present disclosure. UE 800 includes the structure, hardware, and components as illustrated for UE 115 of FIG. 2. For example, UE 800 includes controller/processor 280, which operates to execute logic or computer instructions stored in memory 282, as well as controlling the components of UE 800 that provide the features and functionality of UE 800. UE 800, under control of controller/processor 280, transmits and receives signals via wireless radios 801a-r and antennas 252a-r. Wireless radios 801a-r include various components and hardware, as illustrated in FIG. 2 for UE 115, including modulator/demodulators 254a-r, MIMO detector 256, receive processor 258, transmit processor 264, and TX MIMO processor 266.

At block 502 of process 500, a UE (e.g., UE 800 or UE 115) determines a compression indication for an LP UCI payload to be multiplexed with an HP UCI payload. In order to implement the functionality for such operations, the UE, under control of controller/processor 280, executes compression indication manager 802, stored in memory 282. The functionality implemented through the execution environment of compression indication manager 802 allows for the UE to perform compression indication related operations according to the various aspects herein. In aspects, determining the compression indication for the LP UCI payload may include determining whether to reduce a size of the LP UCI payload to be multiplexed with the HP UCI payload, and then reducing the size of the LP UCI payload to be multiplexed with the HP UCI payload when a determination to reduce the size of the LP UCI payload to be multiplexed with the HP UCI payload is made.

In some aspects, reducing the size of the LP UCI payload may include compressing the LP UCI payload using a compression algorithm, dropping at least a portion of the LP UCI payload, and/or bundling at least a portion of the LP UCI payload.

In aspects, the compression indication may include one or more of a compression ratio of the LP UCI payload that indicates a ratio of the size of the LP UCI payload before compression to the size of the LP UCI payload after compression, a number of bits of the LP UCI payload after compression, and a type of compression of the LP UCI payload that indicates a manner for reducing the size of the LP UCI payload.

In aspects, determining whether to reduce the size of the LP UCI payload to be multiplexed with the HP UCI payload may include determining whether one or more of several conditions is found to be present. For example, determining whether to reduce the size of the LP UCI payload to be multiplexed with the HP UCI payload may include determining whether a scheduled power for transmitting the multiplexed uplink transmission exceeds a maximum transmit power configured for the UE, determining whether a channel between the UE and the base station is blocked, and/or determining whether a total number of resources scheduled for the uplink transmission is insufficient to carry the multiplexed LP UCI payload and HP UCI payload. In these cases, UE 115 may determine to reduce the size of the LP UCI payload when one of the conditions is found to be present.

In aspects, when the scheduled power for transmitting the multiplexed uplink transmission exceeds the maximum transmit power configured for the UE, reducing the size of the LP UCI payload to be multiplexed with the HP UCI payload may include compressing the LP UCI payload until a total transmit power associated with the compressed LP UCI payload and the HP UCI payload is below the maximum transmit power, and/or until the size of the LP UCI payload is compressed to zero.

In aspects, when the total number of resources scheduled for the uplink transmission is insufficient to carry the multiplexed LP UCI payload and HP UCI payload, reducing the size of the LP UCI payload to be multiplexed with the HP UCI payload may include compressing the LP UCI payload to a number of bits that the total number of resources scheduled for the uplink transmission is sufficient to carry based on a coding rate associated with the LP UCI payload and based on a number of resources to be used for the HP UCI payload.

At block 504 of process 500, UE 115 encodes the compression indication for the LP UCI payload jointly with the HP UCI payload, and at block 506 of process 500, UE 115 encodes the LP UCI payload separately from the jointly-encoded compression indication and HP UCI payload. In order to implement the functionality for such operations, the UE, under control of controller/processor 280, executes encoding logic 803, stored in memory 282. The functionality implemented through the execution environment of encoding logic 803 allows for the UE to perform encoding operations according to the various aspects herein.

In aspects, encoding the LP UCI payload separately from the jointly-encoded compression indication and HP UCI payload may include encoding the LP UCI payload using a first coding rate, and encoding the compression indication and HP UCI payload jointly using a second coding rate different from the first coding rate.

At block 508 of process 500, UE 115 multiplexes the encoded LP UCI payload and the jointly-encoded compression indication and HP UCI payload in an uplink transmission to a base station (e.g., base station 105). UE 115 may then transmit the multiplexed uplink transmission to the base station.

Figure 6:
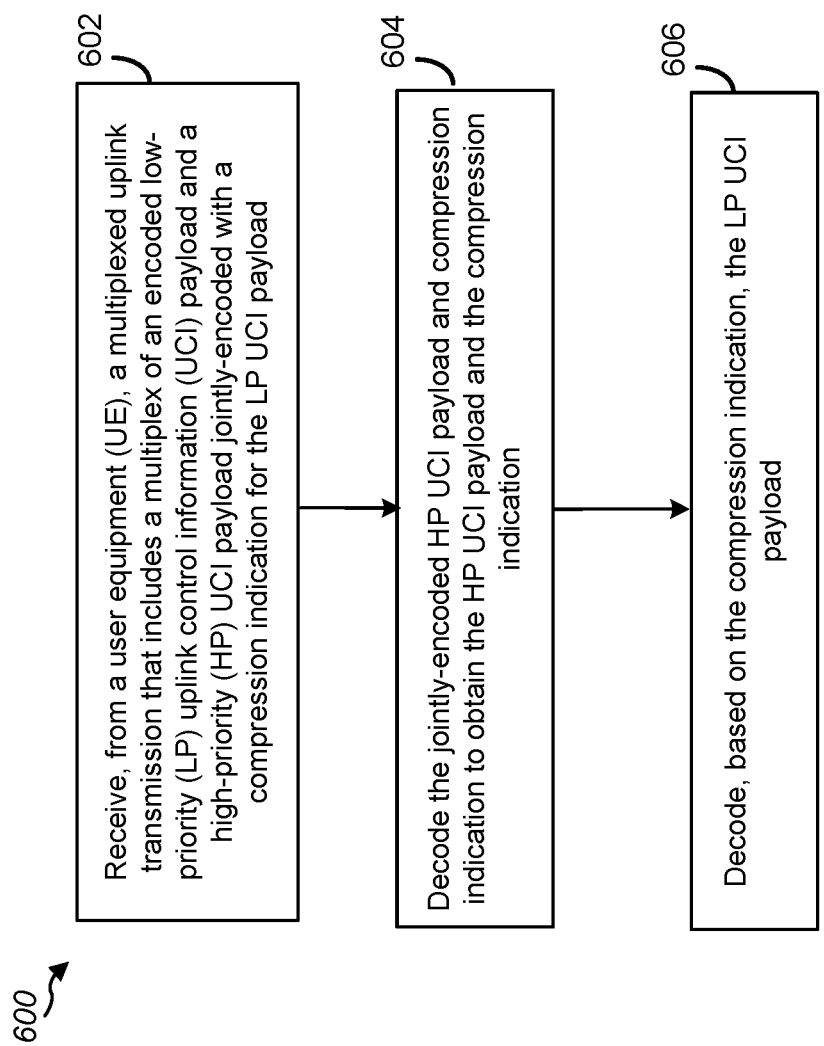
FIG. 6 is a flow diagram illustrating an example process that supports managing compression and compression indications of a low-priority UCI message that is multiplexed with a high-priority UCI message according to one or more aspects.
Figure 9:
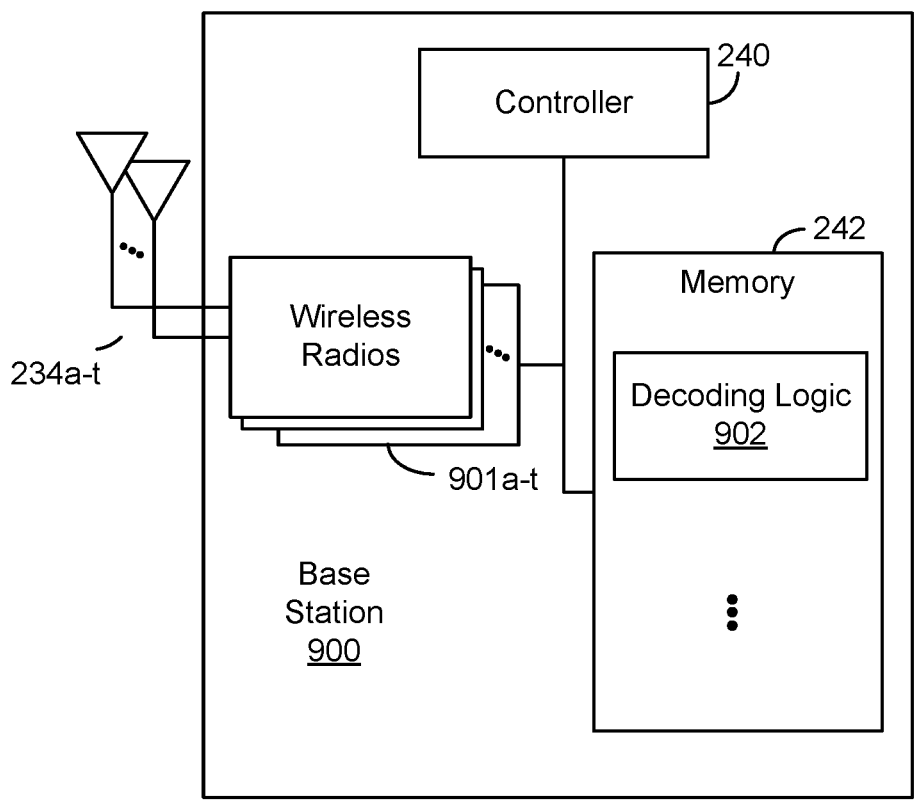
FIG. 9 is a block diagram of an example base station that supports managing compression and compression indications of a low-priority UCI message that is multiplexed with a high-priority UCI message according to one or more aspects.

FIG. 6 is a block diagram illustrating an example an example process 600 that supports managing compression and compression indications of an LP UCI message that is multiplexed with an HP UCI message in a wireless communication system according to one or more aspects. Operations of process 600 may be performed by a base station, such as base station 105 described above with reference to FIGS. 1-4, or base station 900 described with reference to FIG. 9. FIG. 9 is a block diagram illustrating base station 900 configured according to one aspect of the present disclosure. Base station 900 includes the structure, hardware, and components as illustrated for base station 105 of FIG. 2. For example, base station 900 includes controller/processor 240, which operates to execute logic or computer instructions stored in memory 242, as well as controlling the components of base station 900 that provide the features and functionality of base station 900. Base station 900, under control of controller/processor 240, transmits and receives signals via wireless radios 901a-t and antennas 234a-t. Wireless radios 901a-t include various components and hardware, as illustrated in FIG. 2 for base station 105, including modulator/demodulators 232a-t, MIMO detector 236, receive processor 238, transmit processor 220, and TX MIMO processor 230.

At block 602 of process 600, a network entity (e.g., base station 900 or base station 105) receives, from a UE (e.g., UE 115), a multiplexed uplink transmission that includes a multiplex of an encoded LP UCI payload and an HP UCI payload jointly-encoded with a compression indication for the LP UCI payload. In order to implement the functionality for such operations, base station 105, under control of controller/processor 240, executes decoding logic 902, stored in memory 242. The functionality implemented through the execution environment of resource decoding logic 902 allows for base station 105 to perform decoding operations according to the various aspects herein.

At block 604 of process 600, base station 105 decodes the jointly-encoded HP UCI payload and compression indication to obtain the HP UCI payload and the compression indication.

In aspects, the compression indication may include one or more of a compression ratio of the LP UCI payload that indicates a ratio of the size of the LP UCI payload before compression to the size of the LP UCI payload after compression, a number of bits of the LP UCI payload after compression, and a type of compression of the LP UCI payload that indicates a manner for reducing the size of the LP UCI payload. In aspects, a zero number of bits of the LP UCI payload after compression may indicate to base station 105 that no LP UCI bits are included in the multiplexed uplink transmission, and a non-zero number of bits of the LP UCI payload after compression may indicate to base station 105 that at least one LP UCI bit is included in the multiplexed uplink transmission. In aspects, base station 105 may use the compression indication to decide the LP UCI payload. At block 606 of process 600, base station 105 decodes, based on the compression indication, the LP UCI payload.

Figure 7:
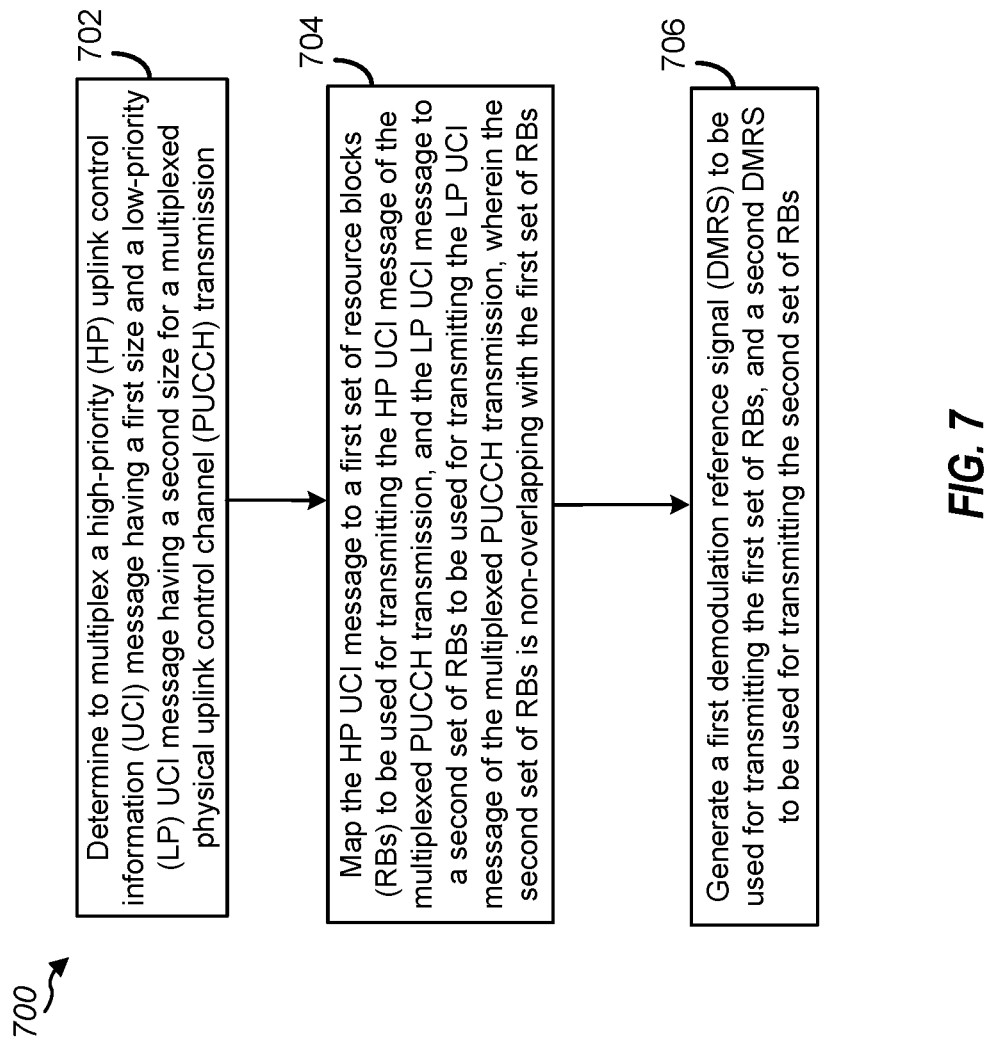
FIG. 7 is a flow diagram illustrating an example process that supports non-overlapping resource block allocation and priority-specific DMRS assignment for multiplexed UCI messages of different priorities according to one or more aspects.

FIG. 7 is a flow diagram illustrating an example process 700 that supports non-overlapping resource block allocation and priority-specific DMRS assignment for multiplexed UCI messages of different priorities in a wireless communication system according to one or more aspects in a wireless communication system according to one or more aspects. Operations of process 700 may be performed by a UE, such as UE 115 described above with reference to FIGS. 1-4, or UE 800 described with reference to FIG. 8. For example, example operations (also referred to as "blocks") of process 500 may enable UE 115 to support non-overlapping resource block allocation and priority-specific DMRS assignment for multiplexed UCI messages of different priorities.

At block 702 of process 700, a UE (e.g., UE 800 or UE 115) determines to multiplex an HP UCI message having a first size and an LP UCI message having a second size for a multiplexed PUCCH transmission. In order to implement the functionality for such operations, the UE, under control of controller/processor 280, executes multiplexing manager 804, stored in memory 282. The functionality implemented through the execution environment of multiplexing manager 804 allows for the UE to perform multiplexing related operations according to the various aspects herein. In aspects, determining to multiplex the HP UCI message and the LP UCI message may include determining a PUCCH resource collision. For example, a PUCCH resource in which UE 600 may be scheduled to transmit the HP UCI message may collide in time with a PUCCH resource in which UE 600 may be scheduled to transmit the LP UCI message. Due to this collision, UE 600 may determine to multiplex the HP UCI message and the LP UCI message in a same PUCCH resource (e.g., a multiplexed PUCCH resource for transmitting a multiplexed PUCCH transmission including a multiplex of the LP UCI message and the HP UCI message).

At block 704 of process 700, UE 115 maps the HP UCI message to a first set of RBs to be used for transmitting the HP UCI message of the multiplexed PUCCH transmission, and the LP UCI message to a second set of RBs to be used for transmitting the LP UCI message of the multiplexed PUCCH transmission. In aspects, the second set of RBs is non-overlapping with the first set of RBs. In order to implement the functionality for such operations, the UE, under control of controller/processor 280, executes RB mapping logic 805, stored in memory 282. The functionality implemented through the execution environment of RB mapping logic 805 allows for the UE to perform RB mapping operations according to the various aspects herein.

In aspects, the number of RBs in the first set of RBs may be based on the size of the HP UCI message, and may not depend on the size of the LP UCI message. In addition, the number of RBs in the first set of RBs may be based on the coding rate associated with the HP UCI message transmission within the uplink transmission.

At block 706 of process 700, UE 115 generates a first DMRS to be used for transmitting the first set of RBs, and a second DMRS to be used for transmitting the second set of RBs. In order to implement the functionality for such operations, the UE, under control of controller/processor 280, executes DMRS generation logic 806, stored in memory 282. The functionality implemented through the execution environment of DMRS generation logic 806 allows for the UE to perform DMRS generation operations according to the various aspects herein.

In aspects, the first DMRS sequence may be generated based on the number of RBs in the first set of RBs for transmitting the HP UCI message, and the second DMRS sequence may be generated based on the number of RBs in the second set of RBs for transmitting the LP UCI message. In aspects, UE 115 may transmit the HP UCI message of the multiplexed uplink transmission in the first set of RBs using the first DMRS, and may transmit the LP UCI message of the multiplexed uplink transmission in the second set of RBs using the second DMRS.

In one or more aspects, techniques for supporting managing compression and compression indications of an LP UCI message that is multiplexed with an HP UCI message in a wireless communication system according to one or more aspects may include additional aspects, such as any single aspect or any combination of aspects described below or in connection with one or more other processes or devices described elsewhere herein. In a first aspect, supporting managing compression and compression indications of an LP UCI message that is multiplexed with an HP UCI message in a wireless communication system may include an apparatus configured to determine a compression indication for a low-priority (LP) uplink control information (UCI) payload to be multiplexed with a high-priority (HP) UCI payload, encode the compression indication for the LP UCI payload jointly with the HP UCI payload, encode the LP UCI payload separately from the jointly-encoded compression indication and HP UCI payload, and multiplex the encoded LP UCI payload and the jointly-encoded compression indication and HP UCI payload in an uplink transmission to a base station. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, determining the compression indication for the LP UCI payload includes determining whether to reduce a size of the LP UCI payload to be multiplexed with the HP UCI payload.

In a third aspect, alone or in combination with the second aspect, determining the compression indication for the LP UCI payload includes reducing the size of the LP UCI payload to be multiplexed with the HP UCI payload when a determination to reduce the size of the LP UCI payload to be multiplexed with the HP UCI payload is made.

In a fourth aspect, alone or in combination with one or more of the first aspect through the third aspect, the compression indication includes a compression ratio of the LP UCI payload that indicates a ratio of the size of the LP UCI payload before compression to the size of the LP UCI payload after compression.

In a fifth aspect, alone or in combination with the fourth aspect, the compression indication includes a number of bits of the LP UCI payload after compression.

In a sixth aspect, alone or in combination with one or more of the fourth aspect through the fifth aspect, the compression indication includes a type of compression of the LP UCI payload, wherein the type of compression indicates a manner for reducing the size of the LP UCI payload.

In a seventh aspect, alone or in combination with one or more of the first aspect through the sixth aspect, a zero number of bits of the LP UCI payload after compression indicates that no LP UCI bits are included in the multiplexed uplink transmission, and a non-zero number of bits of the LP UCI payload after compression indicates that at least one LP UCI bit is included in the multiplexed uplink transmission.

In an eighth aspect, alone or in combination with one or more of the first aspect through the seventh aspect, reducing the size of the LP UCI payload to be multiplexed with the HP UCI payload includes compressing the LP UCI payload using a compression algorithm.

In a ninth aspect, alone or in combination with one the eighth aspect, reducing the size of the LP UCI payload to be multiplexed with the HP UCI payload includes dropping at least a portion of the LP UCI payload.

In a tenth aspect, alone or in combination with one or more of the eighth aspect through the ninth aspect, dropping the at least a portion of the LP UCI payload includes discarding without multiplexing the at least a portion of the LP UCI payload with the HP UCI payload.

In an eleventh aspect, alone or in combination with one or more of the eighth aspect through the tenth aspect, reducing the size of the LP UCI payload to be multiplexed with the HP UCI payload includes bundling at least a portion of the LP UCI payload.

In a twelfth aspect, alone or in combination with one or more of the eighth aspect through the eleventh aspect, bundling at least a portion of the LP UCI payload includes bundling more than one bit of the LP UCI payload into one bit of the LP UCI payload.

In a thirteenth aspect, alone or in combination with one or more of the first aspect through the twelfth aspect, determining whether to reduce the size of the LP UCI payload to be multiplexed with the HP UCI payload includes determining whether a scheduled power for transmitting the multiplexed uplink transmission exceeds a maximum transmit power configured for the UE.

In a fourteenth aspect, alone or in combination with the thirteenth aspect, determining whether to reduce the size of the LP UCI payload to be multiplexed with the HP UCI payload includes determining whether a channel between the UE and the base station is blocked.

In a fifteenth aspect, alone or in combination with one or more of the thirteenth aspect through the fourteenth aspect, determining whether to reduce the size of the LP UCI payload to be multiplexed with the HP UCI payload includes determining whether a total number of resources scheduled for the uplink transmission is insufficient to carry the multiplexed LP UCI payload and HP UCI payload.

In a sixteenth aspect, alone or in combination with one or more of the first aspect through the fifteenth aspect, when the scheduled power for transmitting the multiplexed uplink transmission exceeds the maximum transmit power configured for the UE, reducing the size of the LP UCI payload to be multiplexed with the HP UCI payload includes compressing the LP UCI payload until a total transmit power associated with the compressed LP UCI payload and the HP UCI payload is below the maximum transmit power.

In a seventeenth aspect, alone or in combination with the sixteenth aspect, when the scheduled power for transmitting the multiplexed uplink transmission exceeds the maximum transmit power configured for the UE, reducing the size of the LP UCI payload to be multiplexed with the HP UCI payload includes compressing the LP UCI payload until the size of the LP UCI payload is compressed to zero.

In an eighteenth aspect, alone or in combination with one or more of the first aspect through the seventeenth aspect, when the total number of resources scheduled for the uplink transmission is insufficient to carry the multiplexed LP UCI payload and HP UCI payload, reducing the size of the LP UCI payload to be multiplexed with the HP UCI payload includes compressing the LP UCI payload to a number of bits that the total number of resources scheduled for the uplink transmission is sufficient to carry based on a coding rate associated with the LP UCI payload and based on a number of resources to be used for the HP UCI payload.

In a nineteenth aspect, alone or in combination with one or more of the first aspect through the eighteenth aspect, encoding the LP UCI payload separately from the jointly-encoded compression indication and HP UCI payload includes encoding the LP UCI payload using a first coding rate.

In a twentieth aspect, alone or in combination with the nineteenth aspect, encoding the LP UCI payload separately from the jointly-encoded compression indication and HP UCI payload includes encoding the compression indication and HP UCI payload jointly using a second coding rate different from the first coding rate.

In a twenty-first aspect, alone or in combination with one or more of the first aspect through the twentieth aspect, the uplink transmission is one of a PUSCH transmission or a PUCCH transmission.

In a twenty-second aspect, supporting non-overlapping resource block allocation and priority-specific DMRS assignment for multiplexed UCI messages of different priorities in a wireless communication system may include an apparatus configured to determine to multiplex an HP UCI message having a first size and an LP UCI message having a second size for a multiplexed PUCCH transmission, and to map the HP UCI message to a first set of RBs to be used for transmitting the HP UCI message of the multiplexed PUCCH transmission, and the LP UCI message to a second set of RBs to be used for transmitting the LP UCI message of the multiplexed PUCCH transmission. In this aspect, the second set of RBs is non-overlapping with the first set of RBs. The apparatus is further configured to generate a first DMRS to be used for transmitting the first set of RBs, and a second DMRS to be used for transmitting the second set of RBs. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-third aspect, alone or in combination with one or more of the twenty-second aspect through the twenty-second aspect, mapping the HP UCI message to the first set of RBs includes determining a number of RBs for the first set of RBs based on a size of the HP UCI message and a coding rate associated with the HP UCI message.

In a twenty-fourth aspect, alone or in combination with one or more of the twenty-second aspect through the twenty-third aspect, the first DMRS is generated based on a number of RBs in the first set of RBs, and the second DMRS is generated based on a number of RBs in the second set of RBs.

In a twenty-fifth aspect, alone or in combination with one or more of the twenty-second aspect through the twenty-fourth aspect, the PUCCH transmission includes a format 3 PUCCH transmission.

In a twenty-sixth aspect, alone or in combination with one or more of the twenty-second aspect through the twenty-fifth aspect, the techniques of the twenty-second aspect include transmitting the HP UCI message of the multiplexed PUCCH transmission in the first set of RBs.

In a twenty-seventh aspect, alone or in combination with the twenty-sixth aspect, the techniques of the twenty-second aspect include transmitting the LP UCI message of the multiplexed PUCCH transmission in the second set of RBs.

In a twenty-eighth aspect, supporting managing compression and compression indications of an LP UCI message that is multiplexed with an HP UCI message in a wireless communication system may include an apparatus configured to receive, from a UE, a multiplexed uplink transmission that includes a multiplex of an encoded LP UCI payload and an HP UCI payload jointly-encoded with a compression indication for the LP UCI payload, decode the jointly-encoded HP UCI payload and compression indication to obtain the HP UCI payload and the compression indication, and decode, based on the compression indication, the LP UCI payload. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-ninth aspect, alone or in combination with one or more of the twenty-eighth aspect through the twenty-eighth aspect, the compression indication includes a compression ratio of the LP UCI payload that indicates a ratio of the size of the LP UCI payload before compression by the UE to the size of the LP UCI payload after compression by the UE.

In a thirtieth aspect, alone or in combination with the twenty-ninth aspect, the compression indication includes a number of bits of the LP UCI payload after compression by the UE.

In a thirty-first aspect, alone or in combination with one or more of the twenty-ninth aspect through the thirtieth aspect, the compression indication includes a type of compression of the LP UCI payload.

In a thirty-second aspect, alone or in combination with one or more of the twenty-ninth aspect through the thirty-first aspect, the type of compression indicates a manner for reducing the size of the LP UCI payload by the UE.

In a thirty-third aspect, alone or in combination with one or more of the twenty-eighth aspect through the thirty-second aspect, a zero number of bits of the LP UCI payload after compression indicates that no LP UCI bits are included in the multiplexed uplink transmission, and a non-zero number of bits of the LP UCI payload after compression indicates that at least one LP UCI bit is included in the multiplexed uplink transmission.

In a thirty-fourth aspect, alone or in combination with one or more of the twenty-eighth aspect through the thirty-fourth aspect, the compression indication indicates that a size of the LP UCI payload was reduced by the UE before multiplexing with the HP UCI payload.

In a thirty-fifth aspect, alone or in combination with the thirty-third aspect, the UE reduces the size of the LP UCI payload by compressing the LP UCI payload using a compression algorithm.

In a thirty-sixth aspect, alone or in combination with one or more of the thirty-third aspect through the thirty-fifth aspect, the UE reduces the size of the LP UCI payload by dropping at least a portion of the LP UCI payload.

In a thirty-seventh aspect, alone or in combination with one or more of the thirty-third aspect through the thirty-sixth aspect, dropping the at least a portion of the LP UCI payload includes discarding without multiplexing the at least a portion of the LP UCI payload with the HP UCI payload.

In a thirty-eighth aspect, alone or in combination with one or more of the thirty-third aspect through the thirty-seventh aspect, the UE reduces the size of the LP UCI payload by bundling at least a portion of the LP UCI payload.

In a thirty-ninth aspect, alone or in combination with one or more of the thirty-third aspect through the thirty-eighth aspect, bundling at least a portion of the LP UCI payload includes bundling more than one bit of the LP UCI payload into one bit of the LP UCI payload.

In a fortieth aspect, alone or in combination with one or more of the twenty-eighth aspect through the thirty-ninth aspect, the size of the LP UCI payload is reduced by the UE in response to determining whether a scheduled power for transmitting the multiplexed uplink transmission exceeds a maximum transmit power configured for the UE.

In a forty-first aspect, alone or in combination with the fortieth aspect, the size of the LP UCI payload is reduced by the UE in response to determining whether a channel between the UE and the base station is blocked.

In a forty-second aspect, alone or in combination with one or more of the fortieth aspect through the forty-first aspect, the size of the LP UCI payload is reduced by the UE in response to determining whether a total number of resources scheduled for the uplink transmission is insufficient to carry the multiplexed LP UCI payload and HP UCI payload.

In a forty-third aspect, alone or in combination with one or more of the twenty-eighth aspect through the forty-second aspect, when the scheduled power for transmitting the multiplexed uplink transmission exceeds the maximum transmit power configured for the UE, reducing the size of the LP UCI payload to be multiplexed with the HP UCI payload includes compressing the LP UCI payload until a total transmit power associated with the compressed LP UCI payload and the HP UCI payload is below the maximum transmit power.

In a forty-fourth aspect, alone or in combination with the forty-third aspect, when the scheduled power for transmitting the multiplexed uplink transmission exceeds the maximum transmit power configured for the UE, reducing the size of the LP UCI payload to be multiplexed with the HP UCI payload includes compressing the LP UCI payload until the size of the LP UCI payload is compressed to zero.

In a forty-fifth aspect, alone or in combination with one or more of the first aspect through the forty-fourth aspect, when the total number of resources scheduled for the uplink transmission is insufficient to carry the multiplexed LP UCI payload and HP UCI payload, reducing the size of the LP UCI payload to be multiplexed with the HP UCI payload includes compressing the LP UCI payload to a number of bits that the total number of resources scheduled for the uplink transmission is sufficient to carry based on a coding rate associated with the LP UCI payload and based on a number of resources to be used for the HP UCI payload.

In a forty-sixth aspect, alone or in combination with one or more of the first aspect through the forty-fifth aspect, the encoded LP UCI payload is encoded using a first coding rate.

In a forty-seventh aspect, alone or in combination with the forty-sixth aspect, the jointly-encoded HP UCI payload and compression indication are encoded jointly using a second coding rate different from the first coding rate.

In a forty-eighth aspect, alone or in combination with one or more of the first aspect through the forty-seventh aspect, the uplink transmission is one of a PUSCH transmission or a PUCCH transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication at a user equipment (UE), comprising:
   a memory; and
   a processor coupled with the memory and configured to cause the UE to:
   determine a compression indication for a low-priority (LP) uplink control information (UCI) payload to be multiplexed with a high-priority (HP) UCI payload, wherein the compression indication includes an indication whether the LP UCI payload is compressed, an indication of a compression rule with respect to compression of the LP UCI payload, an indication of a manner in which the LP UCI payload is compressed, or a combination thereof;
   encode the compression indication for the LP UCI payload jointly with the HP UCI payload providing a jointly-encoded compression indication and HP UCI payload;
   encode the LP UCI payload separately from the jointly-encoded compression indication and HP UCI payload providing an encoded LP UCI payload; and
   multiplex the encoded LP UCI payload and the jointly-encoded compression indication and HP UCI payload providing a multiplexed uplink transmission in an uplink transmission to a base station.

2. The apparatus of claim 1, wherein causing the UE to determine the compression indication for the LP UCI payload causes the UE to:
   determine whether to reduce a size of the LP UCI payload to be multiplexed with the HP UCI payload; and reduce the size of the LP UCI payload to be multiplexed with the HP UCI payload when a determination to reduce the size of the LP UCI payload to be multiplexed with the HP UCI payload is made.

3. The apparatus of claim 2, wherein the compression indication includes one or more of:
   a compression ratio of the LP UCI payload that indicates a ratio of the size of the LP UCI payload before compression to the size of the LP UCI payload after compression;
   a number of bits of the LP UCI payload after compression; and
   a type of compression of the LP UCI payload, wherein the type of compression indicates a manner for reducing the size of the LP UCI payload.

4. The apparatus of claim 3, wherein a zero number of bits of the LP UCI payload after compression indicates that no LP UCI bits are included in the multiplexed uplink transmission, and a non-zero number of bits of the LP UCI payload after compression indicates that at least one LP UCI bit is included in the multiplexed uplink transmission.

5. The apparatus of claim 2, wherein causing the UE to reduce the size of the LP UCI payload to be multiplexed with the HP UCI payload causes the UE to:
   compress the LP UCI payload using a compression algorithm;
   drop at least a portion of the LP UCI payload, wherein dropping the at least a portion of the LP UCI payload includes discarding without multiplexing the at least a portion of the LP UCI payload with the HP UCI payload; or
   bundle at least a portion of the LP UCI payload, wherein bundling at least a portion of the LP UCI payload includes bundling more than one bit of the LP UCI payload into one bit of the LP UCI payload.

6. The apparatus of claim 2, wherein causing the UE to determine whether to reduce the size of the LP UCI payload to be multiplexed with the HP UCI payload causes the UE to:
   determine whether a scheduled power for transmitting the multiplexed uplink transmission exceeds a maximum transmit power configured for the UE;
   determine whether a channel between the UE and the base station is blocked; or
   determine whether a total number of resources scheduled for the uplink transmission is insufficient to carry the multiplexed LP UCI payload and HP UCI payload.

7. The apparatus of claim 6, wherein, when the scheduled power for transmitting the multiplexed uplink transmission exceeds the maximum transmit power configured for the UE, causing the UE to reduce the size of the LP UCI payload to be multiplexed with the HP UCI payload causes the UE to compress the LP UCI payload until one or more of:
   a total transmit power associated with the compressed LP UCI payload and the HP UCI payload is below the maximum transmit power; or
   the size of the LP UCI payload is compressed to zero.

8. The apparatus of claim 6, wherein, when the total number of resources scheduled for the uplink transmission is insufficient to carry the multiplexed LP UCI payload and HP UCI payload, causing the UE to reduce the size of the LP UCI payload to be multiplexed with the HP UCI payload causes the UE to compress the LP UCI payload to a number of bits that the total number of resources scheduled for the uplink transmission is sufficient to carry based on a coding rate associated with the LP UCI payload and based on a number of resources to be used for the HP UCI payload.

9. The apparatus of claim 1, wherein causing the UE to encode the LP UCI payload separately from the jointly-encoded compression indication and HP UCI payload causes the UE to:
   encode the LP UCI payload using a first coding rate; and
   encode the compression indication and the HP UCI payload jointly using a second coding rate different from the first coding rate.

10. The apparatus of claim 1, wherein the uplink transmission is one of:
    a physical uplink shared channel (PUSCH) transmission; or
    a physical uplink control channel (PUCCH) transmission.

11. An apparatus for wireless communication at a base station, comprising:
    a memory; and
    a processor coupled with the memory and configured to cause the base station to:
      receive, from a user equipment (UE), a multiplexed uplink transmission that includes a multiplex of an encoded low-priority (LP) uplink control information (UCI) payload and a high-priority (HP) UCI payload, the HP UCI payload jointly-encoded with a compression indication for the LP UCI payload to provide a jointly-encoded HP UCI payload and compression indication, wherein the compression indication includes an indication whether the LP UCI payload is compressed, an indication of a compression rule with respect to compression of the LP UCI payload, an indication of a manner in which the LP UCI payload is compressed, or a combination thereof;
      decode the jointly-encoded HP UCI payload and compression indication to obtain the HP UCI payload and the compression indication; and
      decode, based on the compression indication, the LP UCI payload.

12. The apparatus of claim 11, wherein the compression indication includes one or more of:
    a compression ratio of the LP UCI payload that indicates a ratio of a size of the LP UCI payload before compression by the UE to the size of the LP UCI payload after compression by the UE;
    a number of bits of the LP UCI payload after compression by the UE; and
    a type of compression of the LP UCI payload, wherein the type of compression indicates a manner for reducing the size of the LP UCI payload by the UE.

13. The apparatus of claim 12, wherein a zero number of bits of the LP UCI payload after compression indicates that no LP UCI bits are included in the multiplexed uplink transmission, and a non-zero number of bits of the LP UCI payload after compression indicates that at least one LP UCI bit is included in the multiplexed uplink transmission.

14. The apparatus of claim 11, wherein the compression indication indicates that a size of the LP UCI payload was reduced by the UE before multiplexing with the HP UCI payload, wherein the UE reduces the size of the LP UCI payload by one of:
    compressing the LP UCI payload using a compression algorithm;
    dropping at least a portion of the LP UCI payload, wherein dropping the at least a portion of the LP UCI payload includes discarding without multiplexing the at least a portion of the LP UCI payload with the HP UCI payload; or bundling at least a portion of the LP UCI payload, wherein bundling at least a portion of the LP UCI payload includes bundling more than one bit of the LP UCI payload into one bit of the LP UCI payload.

15. The apparatus of claim 11, wherein a size of the LP UCI payload is reduced by the UE in response to one or more of:
   determining whether a scheduled power for transmitting the multiplexed uplink transmission exceeds a maximum transmit power configured for the UE;
   determining whether a channel between the UE and the base station is blocked; or
   determining whether a total number of resources scheduled for uplink transmission is insufficient to carry the multiplexed LP UCI payload and HP UCI payload.

16. The apparatus of claim 15, wherein, when the scheduled power for transmitting the multiplexed uplink transmission exceeds the maximum transmit power configured for the UE, reducing the size of the LP UCI payload to be multiplexed with the HP UCI payload includes compressing the LP UCI payload until one or more of:
   a total transmit power associated with the compressed LP UCI payload and the HP UCI payload is below the maximum transmit power; or
   the size of the LP UCI payload is compressed to zero.

17. The apparatus of claim 15, wherein, when the total number of resources scheduled for uplink transmission is insufficient to carry the multiplexed LP UCI payload and HP UCI payload, reducing the size of the LP UCI payload to be multiplexed with the HP UCI payload includes compressing the LP UCI payload to a number of bits that the total number of resources scheduled for the uplink transmission is sufficient to carry based on a coding rate associated with the LP UCI payload and based on a number of resources to be used for the HP UCI payload.

18. The apparatus of claim 11, wherein the encoded LP UCI payload is encoded using a first coding rate, and wherein the jointly-encoded HP UCI payload and compression indication are encoded jointly using a second coding rate different from the first coding rate.

19. The apparatus of claim 11, wherein uplink transmission of the multiplexed uplink transmission is one of:
   a physical uplink shared channel (PUSCH) transmission; or
   a physical uplink control channel (PUCCH) transmission.

20. A method of wireless communication performed by a user equipment (UE), the method comprising:
   determining a compression indication for a low-priority (LP) uplink control information (UCI) payload to be multiplexed with a high-priority (HP) UCI payload, wherein the compression indication includes an indication whether the LP UCI payload is compressed, an indication of a compression rule with respect to compression of the LP UCI payload, an indication of a manner in which the LP UCI payload is compressed, or a combination thereof;
   encoding the compression indication for the LP UCI payload jointly with the HP UCI payload providing a jointly-encoded compression indication and HP UCI payload;
   encoding the LP UCI payload separately from the jointly-encoded compression indication and HP UCI payload providing an encoded LP UCI payload; and
   multiplexing the encoded LP UCI payload and the jointly-encoded compression indication and HP UCI payload providing a multiplexed uplink transmission in an uplink transmission to a base station.

21. The method of claim 20, wherein determining the compression indication for the LP UCI payload includes:
   determining whether to reduce a size of the LP UCI payload to be multiplexed with the HP UCI payload; and
   reducing the size of the LP UCI payload to be multiplexed with the HP UCI payload when a determination to reduce the size of the LP UCI payload to be multiplexed with the HP UCI payload is made.

22. The method of claim 21, wherein the compression indication includes one or more of:
   a compression ratio of the LP UCI payload that indicates a ratio of the size of the LP UCI payload before compression to the size of the LP UCI payload after compression;
   a number of bits of the LP UCI payload after compression; and
   a type of compression of the LP UCI payload, wherein the type of compression indicates a manner for reducing the size of the LP UCI payload.

23. The method of claim 21, wherein reducing the size of the LP UCI payload to be multiplexed with the HP UCI payload includes one of:
   compressing the LP UCI payload using a compression algorithm;
   dropping at least a portion of the LP UCI payload, wherein dropping the at least a portion of the LP UCI payload includes discarding without multiplexing the at least a portion of the LP UCI payload with the HP UCI payload; or
   bundling at least a portion of the LP UCI payload, wherein bundling at least a portion of the LP UCI payload includes bundling more than one bit of the LP UCI payload into one bit of the LP UCI payload.

24. The method of claim 21, wherein determining whether to reduce the size of the LP UCI payload to be multiplexed with the HP UCI payload includes:
   determining whether a scheduled power for transmitting the multiplexed uplink transmission exceeds a maximum transmit power configured for the UE;
   determining whether a channel between the UE and the base station is blocked; or
   determining whether a total number of resources scheduled for the uplink transmission is insufficient to carry the multiplexed LP UCI payload and HP UCI payload.

25. The method of claim 20, wherein encoding the LP UCI payload separately from the jointly-encoded compression indication and HP UCI payload includes:
   encoding the LP UCI payload using a first coding rate; and
   encoding the compression indication and the HP UCI payload jointly using a second coding rate different from the first coding rate.

* * * * *